US012430256B2

(12) United States Patent
Confalonieri

(10) Patent No.: US 12,430,256 B2
(45) Date of Patent: Sep. 30, 2025

(54) UNLOADED CACHE BYPASS

(71) Applicant: Micron Technology, Inc., Boise, ID (US)

(72) Inventor: Emanuele Confalonieri, Segrate (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/215,115

(22) Filed: Jun. 27, 2023

(65) Prior Publication Data
US 2023/0418755 A1    Dec. 28, 2023

Related U.S. Application Data

(60) Provisional application No. 63/356,378, filed on Jun. 28, 2022.

(51) Int. Cl.
*G06F 12/0888* (2016.01)

(52) U.S. Cl.
CPC ...... *G06F 12/0888* (2013.01); *G06F 2212/60* (2013.01)

(58) Field of Classification Search
CPC .............. G06F 12/0888; G06F 2212/60
See application file for complete search history.

(56) References Cited

U.S. PATENT DOCUMENTS

| | | | | |
|---|---|---|---|---|
| 4,858,111 A | * | 8/1989 | Steps ................. | G06F 12/0804 711/146 |
| 6,470,425 B1 | * | 10/2002 | Yamashiroya ........ | G06F 12/126 711/134 |
| 11,409,601 B1 | | 8/2022 | Brewer et al. | |
| 12,130,739 B2 | * | 10/2024 | Mandal ............... | G06F 12/0811 |
| 2004/0064648 A1 | * | 4/2004 | Brown ................ | G06F 12/0862 711/146 |
| 2007/0113019 A1 | * | 5/2007 | Beukema ............. | G06F 12/126 711/E12.075 |
| 2007/0226418 A1 | * | 9/2007 | Mizuno ............... | G06F 11/3648 711/135 |
| 2013/0262767 A1 | * | 10/2013 | Lih ........................ | G06F 12/121 711/120 |
| 2017/0357600 A1 | | 12/2017 | Moon | |
| 2019/0042451 A1 | * | 2/2019 | Leone ................. | G06F 12/0871 |
| 2019/0079877 A1 | | 3/2019 | Gaur et al. | |

(Continued)

OTHER PUBLICATIONS

Rathi, Nitin, et al. "Cache bypassing and checkpointing to circumvent data security attacks on sttram." arXiv preprint arXiv: 1603.06227 (2016). (Year: 2016).*

(Continued)

*Primary Examiner* — Nicholas J Simonetti
(74) *Attorney, Agent, or Firm* — Brooks, Cameron & Huebsch, PLLC

(57) ABSTRACT

Systems, apparatuses, and methods related to a memory controller for unloaded cache bypass are described. An example memory controller can be coupled to a memory device. The example memory controller can include a cache. The cache can include a cache sequence controller configured to determine a quantity of a pending cache look-up operations, determine the quantity satisfies an unloaded bypass threshold, and cause performance of a bypass memory operation that bypasses the cache and accesses the memory device.

18 Claims, 7 Drawing Sheets

(56) References Cited

U.S. PATENT DOCUMENTS

2020/0174938 A1\* 6/2020 Shergill .............. G06F 12/0868
2021/0034539 A1\* 2/2021 Roberts ............... G06F 12/0897

OTHER PUBLICATIONS

Xie, Xiaolong, et al. "Coordinated static and dynamic cache bypassing for GPUs." 2015 IEEE 21st International Symposium on High Performance Computer Architecture (HPCA). IEEE, 2015. (Year: 2015).\*

\* cited by examiner

UNLOADED CACHE BYPASS

PRIORITY INFORMATION

This application claims the benefit of U.S. Provisional Application No. 63/356,378, filed on Jun. 28, 2022, the contents of which are incorporated herein by reference.

TECHNICAL FIELD

The present disclosure relates generally to semiconductor memory and methods, and more particularly, to apparatuses, systems, and methods for unloaded cache bypass.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
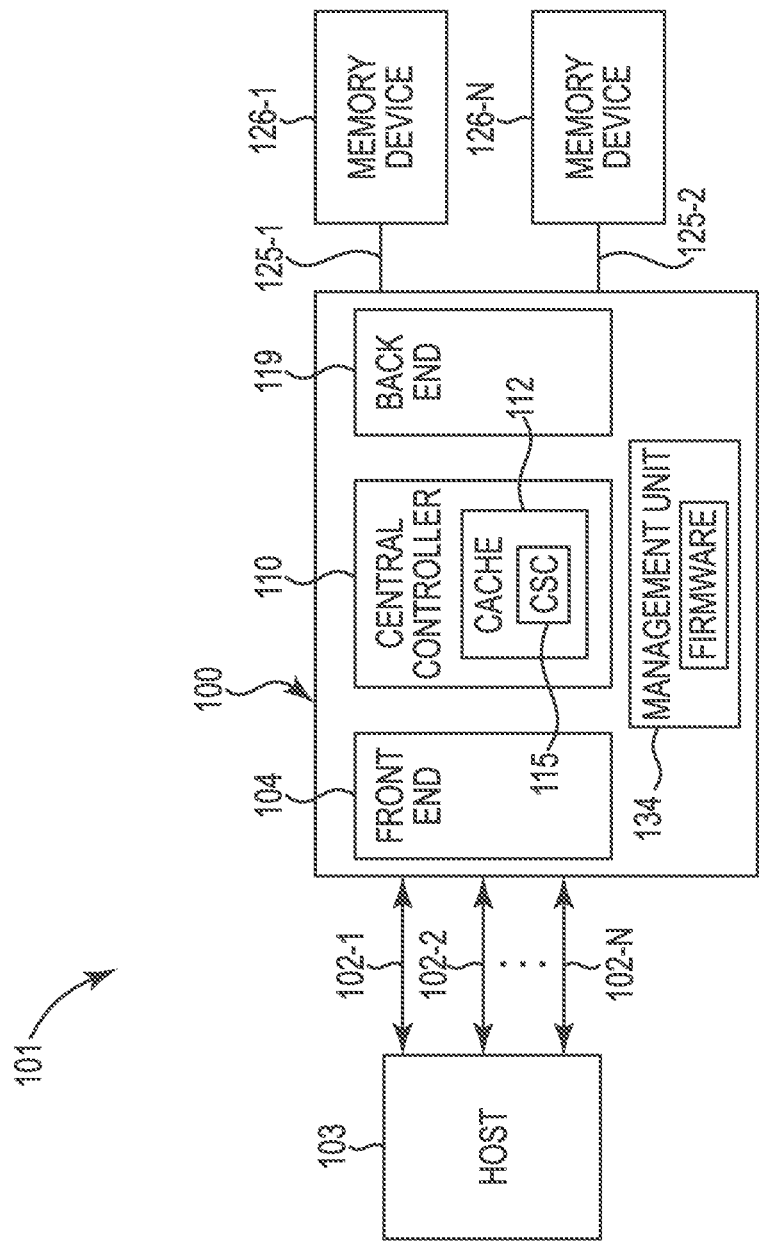
FIG. 1 illustrates a functional block diagram of a computing system including a controller for unloaded cache bypass in accordance with a number of embodiments of the present disclosure.

Systems, apparatuses, and methods related to a controller for unloaded cache bypass are described. A controller includes a front end portion, a central controller portion, a back end portion, and a management unit. The central controller portion can include a cache. The cache can store data associated with memory operation. For instance, the cache can include a volatile memory device such as a DRAM and/or a SRAM.

The cache can include a region of a physical memory storage used to temporarily store data that is likely to be used again. Thus, the cache can store data associated with memory operations (e.g., a read or a write) performed responsive to an access request (e.g., read request and/or write request) to memory. As a result, the cache can include a pool of data entries that have been written thereto.

The cache can include metric logic and/or load telemetry logic. The metric logic can collect information related to metrics associated with memory requests (i.e., access requests) and/or metrics associated with performance of memory operations (e.g., metrics associated with read/writes). For instance, the metric logic can collect metrics associated with memory requests and/or metrics associated with memory operations performed on the cache and/or other memory devices. Similarly, the load telemetry logic can collect information related to load telemetry associated with memory requests (i.e., access requests) and/or loads associated with performance of memory operations (e.g., load telemetry associated with read/writes).

For example, the metric logic can include multiple counters to collect metrics, such as, the number of cacheline hits, cacheline misses, cacheline evictions without writeback, cacheline replacements with writeback, cache read accesses, and/or cache write accesses. In some embodiments, the cache can include a cache memory to store cacheline data. As used herein, a "cacheline hit" or "cache hit" refers to the moment when the requested data can be found in the element (e.g., cache) being searched. As used herein, a "cacheline miss" or "cache miss" refers to the moment when the requested data cannot be found in the element (e.g., cache) being searched.

Use of a cache in conjunction with a memory device may generally enhance computing system performance as compared to performance of a computing system with memory device in the absence of a cache. Yet, an amount of time and/or an amount of computational power utilized to perform a memory operation that results in a cache miss can degrade computing system performance. For instance, a host initiated read operation that seeks to read particular data from a cache takes time (e.g., a quantity of clock cycles) and computation power (e.g., to identify/utilize particular cache tags and/or other types of information associated with data in a cache) to perform and yet, when resulting in a cache miss, does not return the particular data to a host. Thus, computing system performance can be degraded at least due the use of the computation power that could be otherwise utilized. Degradation of computing performance can be particularly pronounced in the event of consecutive host initiated memory operations (e.g., read operations) that result in consecutive cache misses and/or in a large quantity/percentage of cache misses over a relatively short time period.

Such degradation of performance can be undesirable, especially in critical applications and/or in demanding applications in which very high memory sub-system performance is expected. Further, the degraded performance can be exacerbated in mobile (e.g., smartphone, internet of things, etc.) memory deployments in which an amount of space available to house a memory sub-system is limited in comparison to traditional computing architectures.

Aspects of the present disclosure address the above and other deficiencies by performance of unloaded cache bypassing. For instance, based on stored metrics and/or load telemetry, embodiments herein perform unloaded cache bypassing by altering operation of an interface, a memory, and/or a cache as detailed herein. Such alteration based on the stored metrics and/or load telemetry can improve memory performance in comparison to approaches in which unloaded cache bypassing is not performed.

Systems, apparatuses, and methods related to a controller (e.g., a memory or media controller portion) for unloaded cache bypass are described. The memory controller can orchestrate performance of operations to write data to and read data from a cache.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 is a functional block diagram of a computing system 101 (e.g., an apparatus) including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N (collectively referred to herein as memory devices 126) coupled to the memory controller 100. The memory controller 100 which is coupled to the host 103 can be discrete from the one or more of the memory devices 126-1, . . . , 126-N.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port. In at least one embodiment, the interface between the memory controller 100 and the host 103 can be a PCIe physical and electrical interface operated according to a CXL protocol.

The central controller portion 110 can control, in response to receiving a request from the host 103, performance of a memory operation. Examples of the memory operation include memory access request such as a read operation to read data from a memory device 126 or a write operation to write data to a memory device 126.

Figure 3:
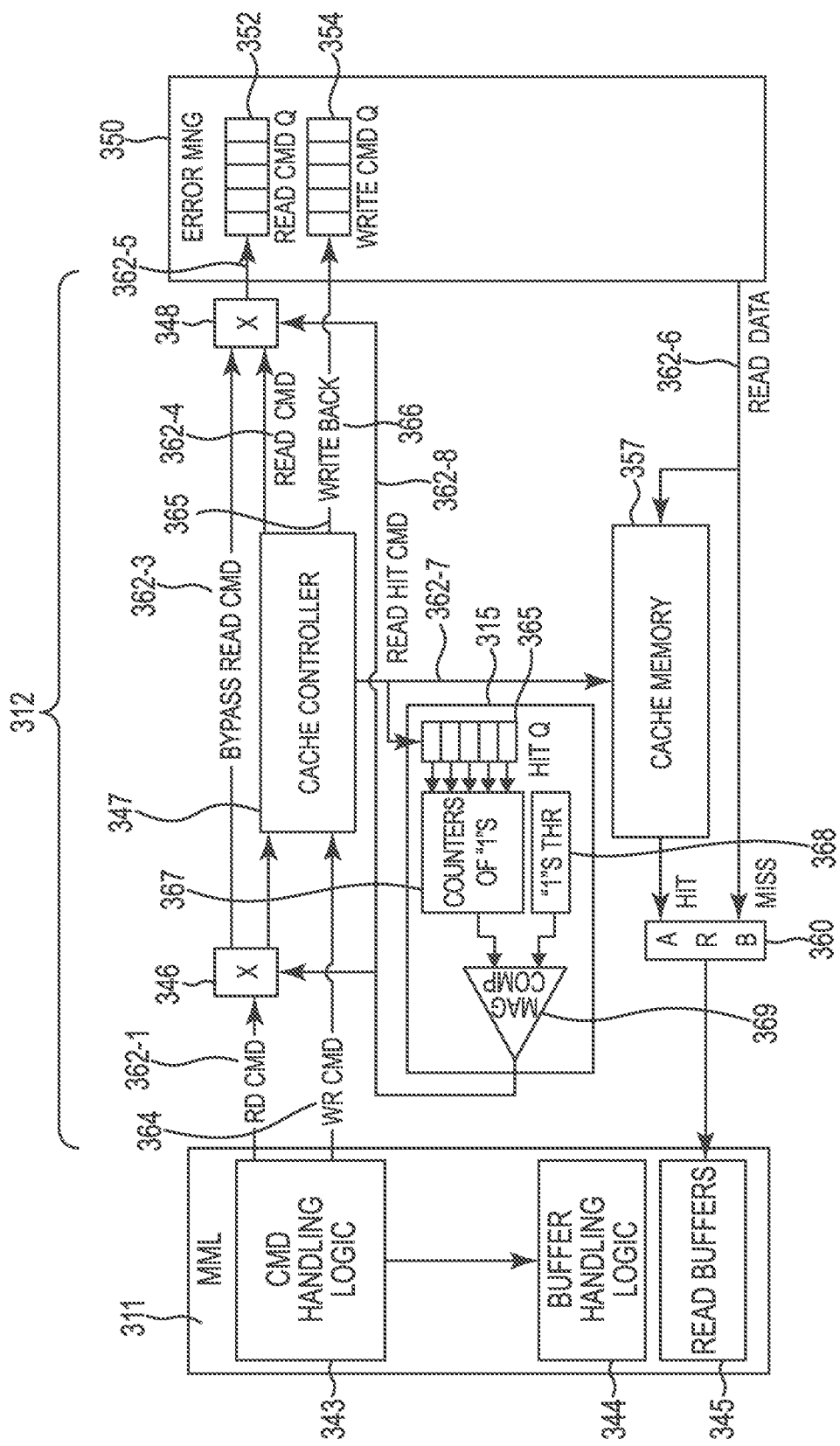
FIG. 3 illustrates a block diagram illustrating a flow of data through a portion of a controller for unloaded cache bypass in accordance with a number of embodiments of the present disclosure.

The central controller portion 110 can include a cache 112 to store data associated with performance of a memory operation and/or a security component (not illustrated) to encrypt data before the data is stored in the memory device 126 and/or the cache 112 (e.g., cache memory 357 shown in FIG. 3). Examples of the security component can include, but are not limited to, software and circuitry configured to implement data encryption, data hashing, data masking, and data tokenization. In some embodiments, in response to receiving a request from the host 103, data from the host 103 can be stored in cache lines of the cache 112. The data in the cache 112 can be written to a memory device 126.

The cache 112 can include a cache sequence controller (CSC) 115. The CSC 115 can determine a quantity of pending look-up operations. In some embodiments, the CSC 115 can determine a quantity of cache misses associated with cache look-up operations. However, other types of results (e.g., cache hits) are possible.

The central controller portion 110 can generate error detection information and/or error correction information based on data received from the host 103. The central controller portion 110 can perform error detection operations and/or error correction operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An example of an error correction operation is an error correction code (ECC) operation. ECC encoding refers to encoding data by adding redundant bits to the data. ECC decoding refers to examining the ECC encoded data to check for any errors in the data. In general, the ECC can not only detect the error but also can correct a subset of the errors it is able to detect.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include a sixteen pin data bus and a two pin data mask inversion (DMI) bus, among other possible buses. The back end portion 119 can exchange (e.g., transmit or receive) data with the memory devices 126 via the data pins and exchange error detection information, RAID information, and/or error correction information with the memory devices 126 via the DMI pins. The error detection information and/or error correction information can be exchanged contemporaneously with the exchange of data.

An example of the memory devices 126 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5).

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
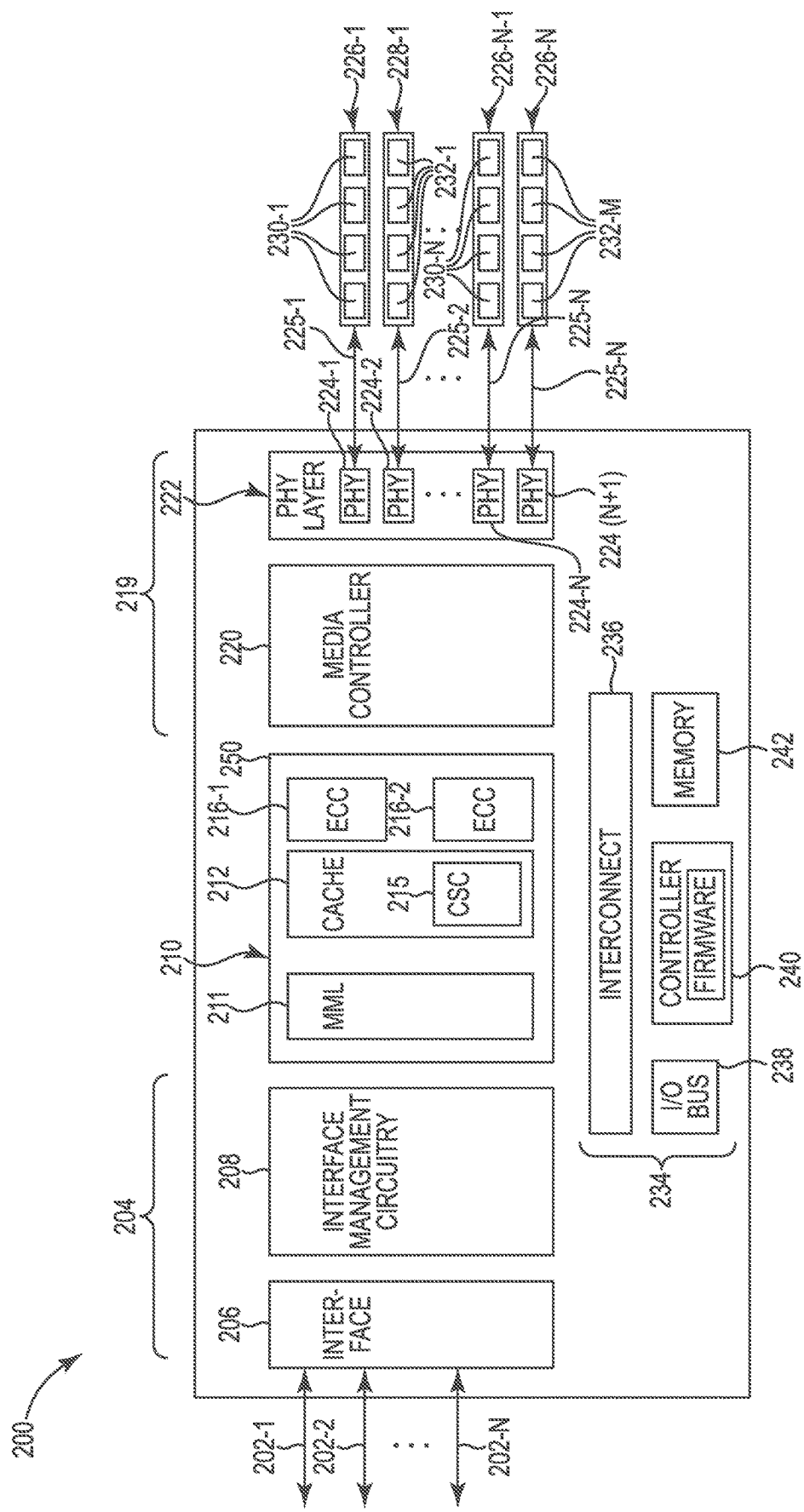
FIG. 2 illustrates a functional block diagram of a controller for unloaded cache bypass in accordance with a number of embodiments of the present disclosure.

FIG. 2 illustrates a functional block diagram of a controller for unloaded cache bypass in accordance with a number of embodiments of the present disclosure. As shown in FIG. 2, a front end portion 204 can include an interface 206, which includes multiple I/O lanes 202-1, 202-2, . . . , 202-N (collectively referred to herein as I/O lanes 202), as well as interface management circuitry 208 to manage the interface 206. An example of the interface 206 is a peripheral component interconnect express (PCIe) 5.0 interface. In some embodiments, the controller can include a peripheral component interconnect express (PCIe) 5.0 interface coupled to the plurality of I/O lanes, wherein the controller is to receive access requests associated with at least one of the cache, a memory device, or any combination thereof, via the PCIe 5.0 interface according to a compute express link protocol.

In some embodiments, the memory controller 200 can receive access requests involving at least one of the cache 212 and the memory devices (e.g., memory dies) 226-1, 226-2, . . . , 226-(N−1), 226-N (collectively referred to herein as memory devices 226) via the interface 206 according to a non-deterministic memory protocol such as a CXL protocol. The interface 206 can receive data from a host (e.g., the host 103 shown in FIG. 1) through the I/O lanes 202. The interface management circuitry 208 may use a non-deterministic protocol such as CXL protocols to manage the interface 206 and may be referred to as CXL interface management circuitry 208. The CXL interface management circuitry 208 can be coupled to a host via the PCIe interface 206.

The central controller 210 can be coupled to the interface management circuitry 208 of the front end 204 (e.g., via a media management layer (MML) 211). In this example, the central controller 210 includes an error manager 250 that includes error correction code (ECC) components 216-1 and 216-2).

The MML 211 can perform various functions such as functions relating to address mapping and/or management of data requests. The MML 211 can include various logic and buffers, among other possible components. For instance, the MML 211 can include command handling logic (not illustrated) and/or buffer handling logic (not illustrated). In some embodiment the MML 211 can include both command handling logic and buffer handling logic. Command handling logic can handle (e.g., route, queue, prioritize, etc.) commands such as those received from the front end 204. Buffer handling logic can handle (e.g., erase, queue, track, etc.) buffers such as read buffers and/or write buffers. In various embodiments, the MML 211 can include read handling logic, buffer handling logic, and read buffers.

The central controller 210 can include a cache 212 to store data in association with performance of the memory operations. An example of the cache 212 is a thirty two (32) way set-associative cache memory including multiple cache lines. The cache line size can be equal to or greater than the memory controller 200 access granularity (e.g., 64 bytes for a CXL protocol). For example, each cache line can include 256 bytes of data. However, embodiments are not so limited. The cache 212 can include the CSC 215.

As shown in FIG. 2, the memory controller 200 can include a back end portion 219 including a media controller 220 coupled to the central controller 210. The back end portion 219 can include a physical (PHY) layer 222 having PHY memory interfaces 224-1, 224-2, . . . , 224-(N−1), 224-N. Each physical interface 224 is configured to be coupled to a respective memory device 226. The PHY layer 222 can be a memory interface to configured for a deterministic memory protocol such as a LPDDRx memory interface.

The back end portion 219 can couple the PHY layer portion 222 to memory banks 230-1, 230-2, . . . , 230-(N−1), 230-N of memory devices 226-1, 226-2, . . . , 226-(N−1), 226-N. The memory devices 226 each include at least one array of memory cells. In some embodiments, the memory devices 226 can be different types of memory. The media control circuitry 220 can be configured to control at least two different types of memory. For example, the memory devices 226-1, 226-2 can be LPDDRx memory operated according to a first protocol and the memory devices 226-(N−1), 226-N can be LPDDRx memory operated according to a second protocol different from the first protocol.

The memory controller 200 can include a management unit 234 configured to initialize, configure, and/or monitor characteristics of the memory controller 200. In some embodiments, the management unit 234 includes a system management (SM) bus 238. The SM bus 238 can manage out-of-band data and/or commands. The SM bus 238 can be part of a serial presence detect. In some embodiments, the SM bus 238 can be a single-ended simple two-wire bus for the purpose of lightweight communication. The management unit 234 can include a CPU subsystem 240, which can function as a controller for the management unit to execute instructions associated with initializing, configuring, and/or monitoring the characteristics of the memory controller 200.

The management unit 234 can include miscellaneous circuitry 242, such as local memory to store codes and/or data associated with managing and/or monitoring the characteristics of the memory controller 200. An endpoint of the management unit 234 can be exposed to the host system (e.g., the host 103 shown in FIG. 1) to manage data. In some embodiments, the characteristics monitored by the management unit 234 can include a voltage supplied to the memory controller 200 and/or a temperature measured by an external sensor. The management unit 234 can include an interconnect 236, such as an advanced high-performance bus (AHB) to couple different components of the management unit 234.

The management unit 234 can include circuitry to manage in-band data (e.g., data that is transferred through the main transmission medium within a network, such as a local area network (LAN)). In some embodiments, the CPU subsystem 240 can be a controller that meets the Joint Test Action Group (JTAG) standard and operate according to an Inter-Integrate Circuit (I2C or I3C) protocol, and auxiliary I/O circuitry. JTAG generally refers to an industry standard for verifying designs and testing printed circuitry boards after manufacture. I2C generally refers to a serial protocol for a two-wire interface to connect low-speed devices like microcontrollers, I/O interfaces, and other similar peripherals in embedded systems. In some embodiments, the auxiliary I/O circuitry can couple the management unit 234 to the memory controller 200. Further, firmware for operating the management unit can be stored in the miscellaneous circuitry 242. In some embodiments, the miscellaneous circuitry 242 can be a flash memory such as flash NOR memory or other persistent flash memory device.

FIG. 3 illustrates a block diagram illustrating a flow of data through a portion of a controller for unloaded cache bypass in accordance with a number of embodiments of the present disclosure. The portion can be a central controller portion of a controller (e.g., controller 100 or 200). The portion of the controller includes a MML 311, an error manager 350, and a cache 312 including a CSC 315, a cache controller 347, a cache memory 357.

As mentioned, the MML 311 can include various logic and buffers, among other possible components. For instance, as illustrated in FIG. 3, the MML can include command (CMD) handling logic 343, buffer handling logic 344, and read buffers 345.

The cache controller 347 can be coupled to the cache memory 357 to manage various aspects of the cache memory 357 and CSC 315. For instance, the cache controller 347 can include logic and/or circuitry that is configured to manage the cache.

As mentioned, the error manager 350 can include error detection and/or error correction circuitry. The error manager 350 can include various queues such as a read command queue 352 and a write command queue 354.

As mentioned, the CSC 315 can determine a quantity of pending cache look-up operations. As illustrated in FIG. 3, the CSC 315 can include a queue such a pending cache look-up queue 365, a cache hit queue (not illustrated), and/or a cache miss queue (not illustrated). In some embodiments, a queue depth of a queue such as the pending cache look-up queue 365 can be configured based on a unloaded bypass threshold. For instance, in some embodiments the queue depth of the pending cache look-up queue 365 can be equal to a unloaded bypass threshold, among other possibilities.

At 362-1, a cache look-up operation (e.g., a read command (RD CMD)) can be transmitted from the MML 311 to a switch 346. The switch 346 can include logic and/or circuitry configured to perform various aspects related to selectively bypass the cache memory 357.

At 364, a write command (WR CMD) can be transmitted by the cache controller 364. The cache look-up operation (e.g., a read command) and/or the write command can be sent from a host to the MML 311 and subsequently sent from the MML 311 to a memory device.

At 362-2, the read command can be transmitted to the cache controller 347. The cache controller 347 can subsequently transmit a cache hit and/or a cache miss command.

At 362-3, a bypass read command can be transmitted to the error manager 350. For instance, the switch 346 can be coupled to the CSC 315 to selectively bypass the cache memory 357 based on a determination by the CSC 315 that a quantity of pending cache look-up operations satisfies (e.g., is less than or equal to) an unloaded bypass threshold, as detailed herein. Thus, the cache controller 347 and the cache memory 357 can be entirely bypassed by the read bypass command. For instance, the bypass read command can be transmitted to the error manager and permit obtaining data from the memory devices in the absence of utilization of any cache tags associated with a cache. Bypassing the cache controller 347 and the cache memory 357 can provide timely and efficient acquisition of the requested data from the memory device when a low cache hit rate is experienced. That is, having a quantity of pending cache look-up operations satisfy an unloaded bypass threshold can be indicative of a low cache hit rate.

At 362-4, a cache miss command (READ CMD) can be transmitted to the error manager 350 and/or a memory device. For instance, both the bypass command and the cache miss command can be transmitted to switch 348. For example, when cache bypassing is enabled and a quantity of pending look-up operations satisfies an unloaded bypass threshold, the bypass command can be transmitted to the switch 348. When cache bypassing is disabled and/or when a quantity of pending look-up operations does not satisfy the unloaded bypass threshold, the cache miss command can be transmitted to the switch in the absence of transmission of a bypass command, among other possibilities. Switch 348 can include logic and/or circuitry configured to perform aspects of unloaded cache bypass. Switch 348 can convey the bypass command and/or the cache miss command to the error manager 350, as 362-5. The error manager 350 can subsequently convey the bypass command and/or the cache miss command to a memory device (e.g., a DRAM memory device and/or a NAND memory device).

At 362-6, read data can be provided to the cache memory 357 and/or an arbitrator 360. The arbitrator 360 refers to logic and/or hardware that is configured to transmit data such as data indicative of a cache hit (e.g., a read hit) or a cache miss (e.g., a read miss) to the MML 311. The arbitrator can coordinate transmission of the cache hit data and/or cache miss data, for instance, to avoid collisions and/or otherwise ensure timely and effective communication of the hit and/or misses. For instance, cache miss data can be provided to the cache memory and/or the arbitrator 360 subsequent to transmitting the cache miss command and/or the bypass read command to the memory device.

At 362-8, a cache hit command (READ HIT CMD) can be transmitted to the cache memory 357 and/or the CSC 315. The CSC 315 can include a plurality of counters 367 to count results such as quantity of cache misses and/or cache hits. For instance, a quantity of cache hits and/or a quantity of cache misses and/or a quantity of pending cache look-up operations can be stored as a respective counts (e.g., a respective quantity of "1's" or "0") in the counters. For instance, a quantity of pending cache look-up operations stored in the counters can be compared by comparison logic/circuitry 369 to a unloaded bypass threshold 368 (e.g., a "1's THR").

At 366, a write-back operation can be performed to write updated data from the cache to a memory device. For instance, the write-back operation can be performed to communicate signaling indicative of the updated data from the cache via the error manager 350 to a memory device. The write-back operation can be performed when the cache look-up results in a cache miss and the cache miss is determined to be a dirty cache miss, as detailed herein.

Figure 4:
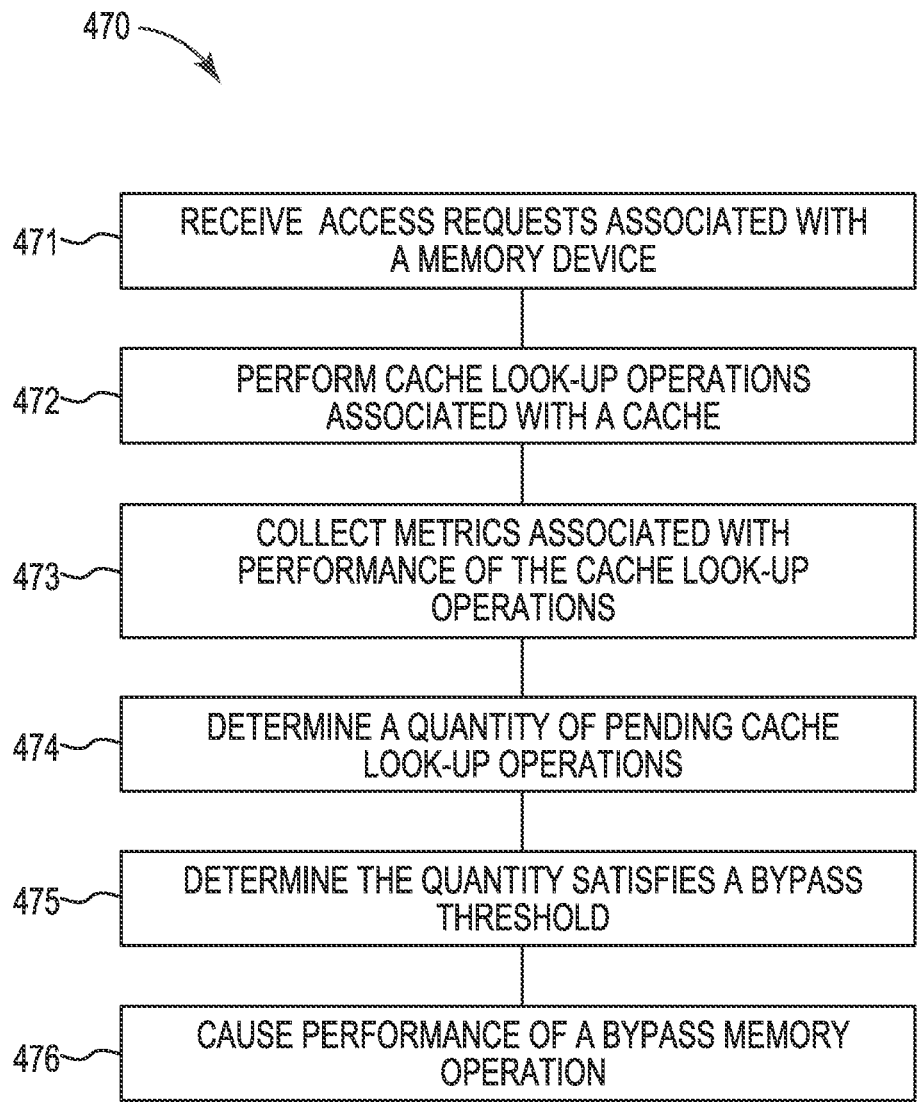
FIG. 4 illustrates a flow diagram of an example method for unloaded cache bypass in accordance with a number of embodiments of the present disclosure.
Figure 5:
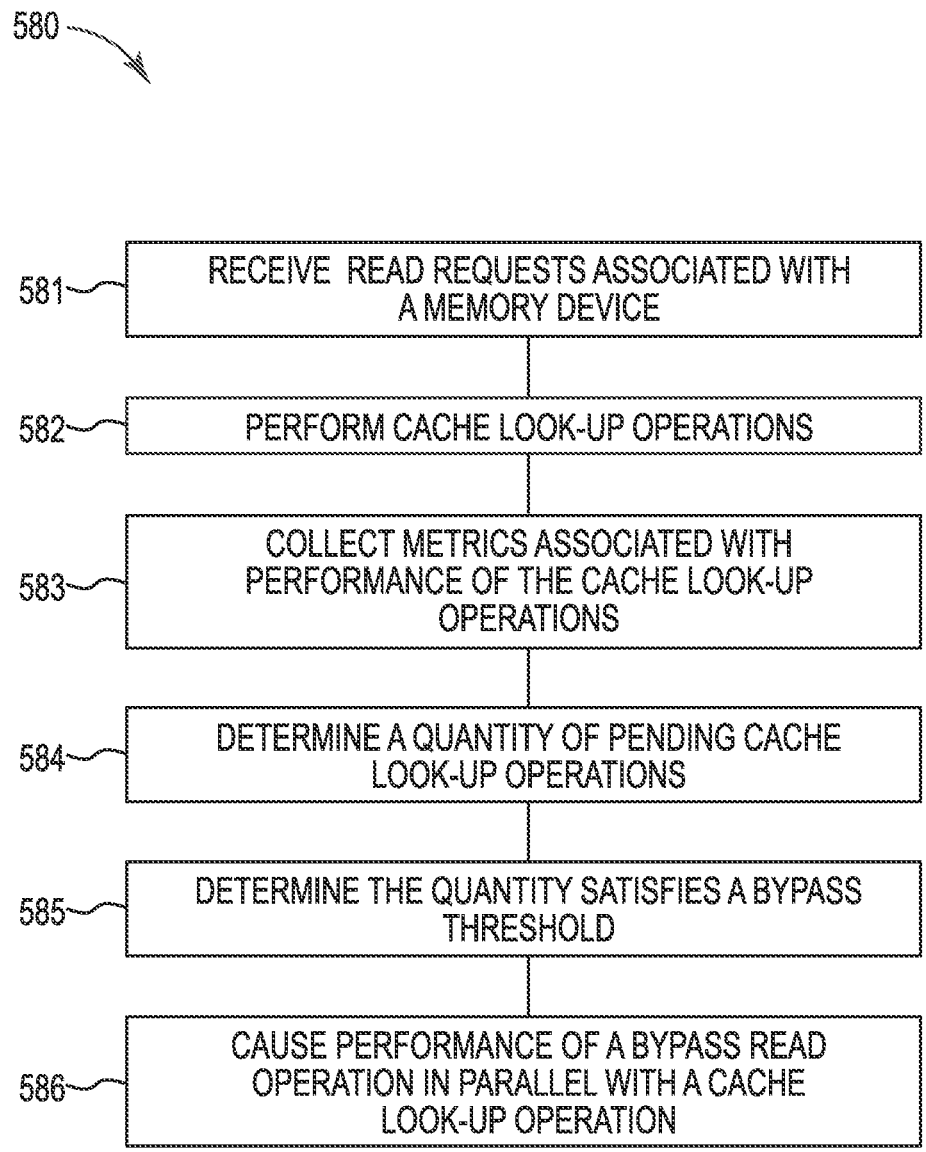
FIG. 5 illustrates a flow diagram of an example method for unloaded cache bypass in accordance with a number of embodiments of the present disclosure.

FIG. 4 illustrates a flow diagram of an example method 470 for unloaded cache bypass in accordance with a number of embodiments of the present disclosure. Similarly, FIG. 5 illustrates a flow diagram of an example method 580 for unloaded cache bypass in accordance with a number of embodiments of the present disclosure. The methods 470, 580 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 471, the method 470 can include receiving an access request associated with a memory device. In some embodiments, the memory device is one of a dynamic random access memory (DRAM) device or a low latency RAM memory device. The memory request can be sent from a host to the central controller portion. In some embodiments, the central controller portion can receive the memory request at a rate of 32 GT/s.

At 472, the method 470 can include performing cache look-up operations on a cache, responsive to the receipt of the access requests. For example, a controller can access the cache to determine if the requested data associated with an access request is stored in the cache. If the data is stored in the cache then the cache can process the access request and provide the requested data. In some embodiments, data can be written from the host to a cache before writing the data to a memory device. That is, data can be accessed from the cache without using the memory device. In some embodiments, accessing data from a cache can increase the speed of accessing data, as compared to accessing data from a memory device. For example, data can be written to the cache after receiving an access request. Similarly, data can be read from the cache when a cache look-up operation is performed after receiving an access request. That is, the cache can include a cache controller to send a read command to the memory device and write the data from the memory device to the cache as a result of an access request. In addition, the cache controller can send a read command to the cache and write the data from the cache to the memory device as a result of an access request.

At 473, the method 470 can include collecting metrics associated with performing the cache look-up operations. For instance, the metrics can be collected for a threshold amount of time. The threshold amount of time can be fixed or variable. For instance, in some embodiments, the threshold amount of time is variable based on a hit rate or a miss rate of the cache look-up operations associated with the cache.

The cache can collect information including metrics collected through a metric logic in the central controller portion. The metric logic can be used to monitor the behavior of the computing system as it relates to memory operations (e.g., requests to read/write to memory). For example, the metric logic can include multiple counters to collect metrics, such as, the number of cacheline hits, cacheline misses, cacheline evictions without writeback, cacheline replacements with writeback, cache read accesses, and/or cache write accesses. In some embodiments, the cache can include a cache memory to store cacheline data.

In some embodiments, the metric logic can include at least one of a hit counter, a miss counter, or a combination thereof. For instance, the metric logic can include a cache hit counter to count the number of cacheline hits when reading data, a write hit counter to count the number of cacheline hits when writing data, a cache miss counter to count the number of cacheline misses when reading data, a write miss counter to count the number of cacheline misses when writing data, a replacement counter to count the number of cacheline evictions without writebacks, a writeback counter to count the number of cacheline replacements with writebacks, a total read access counter to count the number of cache read accesses, and/or a total write access counter to count the number of cache write accesses. In some embodiments, the metric logic can collect a count for each set in the set associative cache. The metric logic can use the counts collected for each set in the set associative cache to determine the most frequently accessed set. In some embodiments, determining the most frequently accessed counter can assist in determining which characteristics of the computing system should be altered.

In some embodiments, the cache can collect information including load telemetry collected through a load telemetry logic in the central controller portion. The load telemetry logic can be used to calculate the read path loads and the write path loads that occur in the computing system by the host and/or memory device. In some embodiments, the load telemetry logic can include multiple telemetry counters to count the write path loads and read path loads that occur in the computing system. The load telemetry logic can determine the load value based on the load telemetry received (e.g., the write path loads and read path loads). The load value can be determined by the average value over the time it takes to reduce oscillations of traffic from the host. The telemetry ratio is calculated (e.g., measured) by dividing the load telemetry of the telemetry counter by the load value.

In some embodiments, the cache can store the collected information in a storage area. The storage area can be any type of volatile memory and/or non-volatile memory. For instance, the storage area can be random access memory (RAM), NOR flash, among other possibilities. In some embodiments, the metric logic can store a count from each counter in the storage area after each metric storage event. In some embodiments, the counter can store the count as an absolute value and/or store the count as a percentage (e.g., percentage of hit/misses over a total number of access requests).

For example, the cache can store, in the storage area, the load telemetry collected by the load telemetry logic and the metrics collected by the metric logic. In some embodiments, the load telemetry logic can store the load telemetry count from the telemetry counters and the telemetry ratio to the storage area after a threshold amount of time. In some embodiments, the metric logic can store the count form each respective counter to the storage area. The metric logic can cause each counter to store respective counts to the storage area after a threshold amount of time. In some embodiments, the count for each respective counter of the metric logic can be reset to an initial value after a period of time, a quantity of cycles, and/or responsive to an input, among other possibilities. In addition, an interrupt request can be sent to the interconnect to alert the interconnect that a new metric is stored in the storage area, after the metric storage event.

Figure 7:
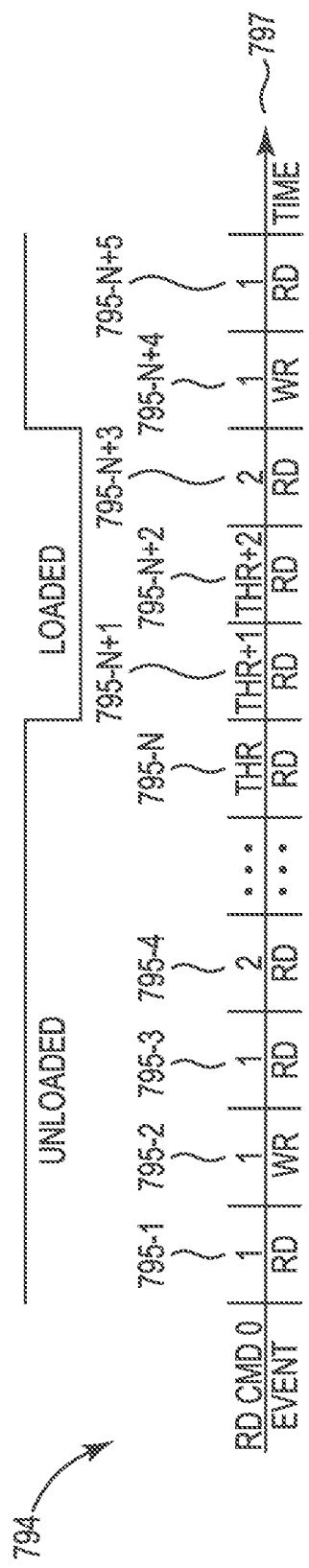
FIG. 7 illustrates another example of a diagram for unloaded cache bypass in accordance with a number of embodiments of the present disclosure.

The metric logic can include a pending cache look-up operation counter configured to increase when a pending cache look-up operation is detected and decrease when a pending cache look-up operation is completed (e.g., when a cache hit or a cache miss associated with the cache look-up operation is determined), for instance as detailed herein with respect to FIG. 7.

The metric logic can include a cache hit counter configured to increase when a cache hit is detected and a cache miss counter configured to increase when a cache miss is detected. For instance, the counters can include a cache hit counter configured to increase when a cache hit is detected and/or a cache miss counter configured to increase when a cache miss is detected. In some embodiments, counters can include both a cache hit counter configured to increase when a cache hit is detected and a cache miss counter configured to increase when a cache miss is detected. In some embodiments, each counter can be configured to reset to an initial value after the respective counts are stored using the storage area and/or after a threshold amount of time has elapsed.

In some embodiments, the storage area can include multiple rows to store counts for each counter of the metric logic and each telemetry counter of the load telemetry logic. That is, each counter and telemetry counter can have a designated row to store respective counts to in the storage area. In some embodiments, each row can include multiple slots. The metric logic can store a count to a different slot within a designated row after each metric storage event. Similarly, the load telemetry logic can store the count from the telemetry count to a different slot within a designated row after a threshold amount of time. Storing each count to a different slot within a designated row can allow the computing system to track the behavior of memory operations over time. In some embodiments, tracking the behavior of memory operations and/or cache look-up operations in the computing system can improve the computing system, for instance, by permitting unloaded cache bypass as detailed herein.

At 474, a quantity of pending cache look-up operations can be determined. As used herein, a pending cache look-up operation refers to cache-look up operation associated with an access request that has been initiated but has not yet been completed (e.g., a cache hit or cache miss associated with the cache look-up operation has not yet been determined). For instance, based on a the collected metrics, a quantity of pending cache look-up operations can be determined. That is, in some embodiments, a quantity of pending cache look-up operations in a queue such as a read queue associated with the cache can be determined. The cache can be configured to operate in accordance with the first-in first-out cache (FIFO) replacement policy can be determined. However, embodiments employing other types of cache replacement policies are possible.

At 475, a quantity of pending cache look-up operations can be compared to a unloaded bypass threshold. Thus, it can be determined if the quantity of pending cache look-up operations satisfies (e.g., is less than or equal to) the unloaded bypass threshold, as detailed herein.

The unloaded bypass threshold can be a fixed quantity or a variable quantity. For instance, in some embodiments the unloaded bypass threshold can be a variable unloaded bypass threshold that varies based on a cache hit rate or a cache miss rate of cache operations associated with the cache. For example, the unloaded bypass threshold can be decreased based on the cache hit rate being above a target hit rate and can be increased based on the cache hit rate being below a target hit rate. Thus, the unloaded bypass threshold can be tuned to promote the cache hit rate (or cache miss rate) to become closer to and/or equal to a target hit rate (or target miss rate).

As used herein, the target hit rate refers to a percentage or other indicator of cache look-up operations that result in acquisition of data from a cache (a cache hit), whereas a target miss rate refers to a percentage or other indicator of cache look-up operations that do not result in acquisition of data from the cache (a cache miss). The target hit rate and/or target miss rate can be fixed or variable (e.g., variable based upon a system condition and/or a command received from a host). The target hit rate and/or the target miss rate can be stored in a look-up table or other data structure.

At 476, a bypass operation can be performed responsive to a determination that the quantity of pending cache look-up operations satisfies the unloaded bypass threshold. For instance, a bypass read operation can be performed responsive to a determination that a quantity pending cache look-up operations is less than or equal to the unloaded bypass threshold. In some embodiments, the bypass operation can include a plurality of bypass read operations. For instance, the plurality of bypass operations can be performed responsive to a plurality of host requests received while a quantity of pending look-up operations satisfies the unloaded bypass threshold.

A bypass read operation can be omitted (not performed) responsive to a determination that a quantity of pending cache look-up operations does not satisfy the unloaded bypass threshold. For instance, a bypass read operation can be omitted (not performed) responsive to a determination that a quantity of pending cache look-up operations is greater than the unloaded bypass threshold. That is, when the quantity of pending cache look-up operation is greater than the unloaded bypass threshold the cache can be designated as being in a loaded state.

In some embodiments, cache bypassing can be enabled and/or performed responsive to a determination that a cache is no longer in a loaded state (e.g., a quantity of pending cache operations is less than or equal to a bypass threshold and thus the cache is designated as being in an unloaded state). However, in some embodiments, responsive to a cache being designated in a loaded state, bypass operations are not performed until the quantity of the pending look-up operations is less than exit threshold. The exit threshold can be less than the unloaded bypass threshold. Thus, bypass operation is not performed and/or enabled until the quantity of the pending cache look-up operations is less than less than the exit threshold and thus is a sufficiently less than the unloaded bypass threshold. Stated differently, in various embodiments a controller can abstain from performance of a bypass read operation until the quantity of the pending look-up operations is less than the exit threshold.

FIG. 5 illustrates a flow diagram of an example method 580 for unloaded cache bypass in accordance with a number of embodiments of the present disclosure. At 581, the method 580 can include receiving a read request associated with a memory device. As mentioned, the read request can be a host read request sent from a host to the central controller portion.

At 582, the method 580 can include performing cache look-up operations on a cache (e.g., a cache of a central controller portion), responsive to the receipt of the host read requests.

At 583, the method 580 can include collecting, for a threshold amount of time, information associated with performing the cache look-up operations on the cache. For example, the cache can collect information including metrics collected through a metric logic in the central controller portion. The metric logic can be used to monitor the behavior of the computing system as it relates to cache look-up operations and/or memory operations (e.g., requests to read/write to memory).

At 584, the method 580 can include determination of a quantity of pending cache look-up operations, as detailed herein. At 585, the method 580 can include determination that that quantity of pending cache look-up operations satisfies (e.g., is less than or equal to) an unloaded bypass threshold, as detailed herein.

At 586, the method 580 can cause performance of a bypass memory operation, as detailed herein. For instance, in some embodiments, a bypass read operation can be initiated (e.g., performed) to bypass the cache and access the memory device in response a host read request.

As mentioned, a cache look-up operation associated with the cache can be performed in response to an access request from the host substantially contemporaneously with the performance of the bypass memory operation (e.g., the bypass read). For example, the cache look-up operation and the bypass read operation can be initiated in parallel such that, in at least some instances, the bypass read operation occurs while the cache look-up operation is occurring. For instance, responsive to a determination that an unloaded bypass threshold is satisfied, a cache look-up operation can be performed responsive to a host read request in parallel with a bypass read operation initiated to read data corresponding to the host read request from the memory device. As detailed herein, the substantially contemporaneous performance of the bypass memory operation such as a bypass read operation and a cache look-up operation can provide enhanced performance by selectively utilizing data from the memory device or data from the cache depending on a result of the cache look-up operation.

The bypass read operation can occur when cache bypassing is enabled. In some instances, the cache bypassing can be enabled responsive to a cache metric (e.g., a cache hit rate of cache look-up operations) satisfying a particular criteria (e.g., having a given quantity of pending cache look-up operations, being below a given cache hit rate threshold and/or being above a given cache miss rate threshold, etc.). For instance, cache bypassing can be enabled when a quantity of pending cache look-up operations is less than or equal to an unloaded bypass threshold.

Conversely, cache bypassing can be disabled responsive to a cache metric such as a quantity of pending cache look-up operations being greater than an unloaded bypass threshold. When cache bypassing is disabled, a bypass memory operations is not performed, even in instances when an unloaded cache bypass threshold is satisfied.

Figure 6:
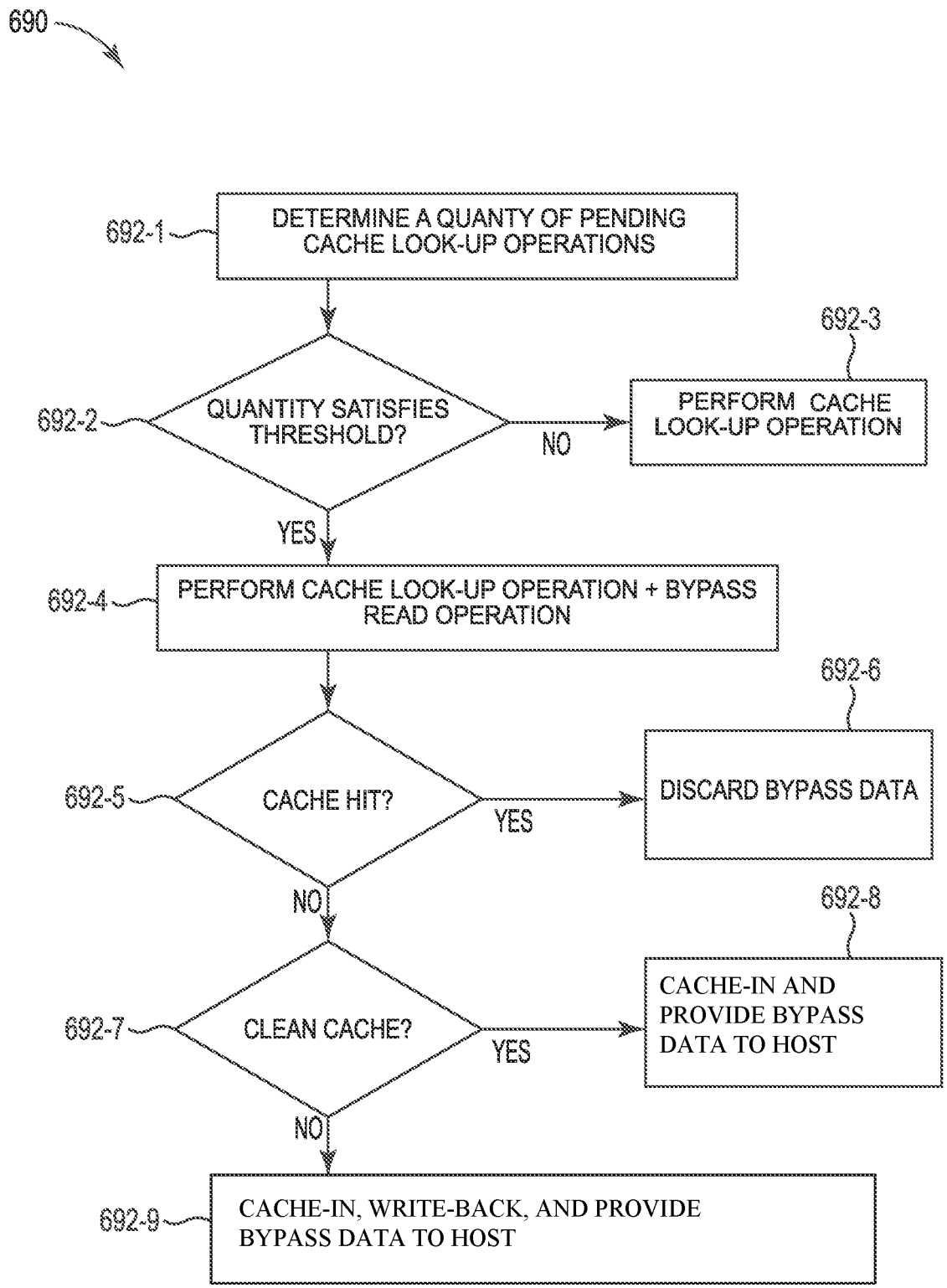
FIG. 6 illustrates an example diagram for unloaded cache bypass in accordance with a number of embodiments of the present disclosure.

FIG. 6 illustrates an example diagram 690 for unloaded cache bypass in accordance with a number of embodiments of the present disclosure. While FIG. 6 is described with respect to read operations, namely read bypass operations, the disclosure is not so limited. For instance, aspects of unloaded cache bypass can be implemented with other memory operations such as write operations, etc.

At 692-1, a quantity of pending cache look-up operations in a read queue associated with a cache can be determined, as described herein. At 692-2, the quantity of pending cache look-up operations in the read queue associated with the cache can be compared to a unloaded bypass threshold to determine whether the quantity of pending cache look-up operations is less than or equal to the unloaded bypass threshold, as detailed herein.

In some embodiments, the unloaded bypass threshold can be equal to a non-zero quantity of pending cache look-up operations. For instance, the non-zero quantity can be equal to a quantity of pending cache look-up operations that is equal to 1, 2, 3, 4, 5, 6, 7, 8, 9, 10, or other possible quantities of pending cache look-up operations that are pending in a queue (e.g., a read queue) of a cache. However, in some embodiments, the unloaded bypass threshold can be equal to zero pending cache look-up operations.

Responsive to a determination that the quantity of pending cache look-up operations does not satisfy (e.g., is greater than) the unloaded bypass threshold the flow can proceed to 692-3. At 692-3, a cache look-up operation can be performed to read data, if present, from a cache, as detailed herein. The cache look-up operation at 692-3 can occur in the absence of a bypass operation and thus avoid incurring any unnecessary computation overhead and/or bus traffic, etc. that would otherwise be associated with performance of the bypass operation.

Responsive to a determination that the quantity of pending cache look-up operations satisfies (e.g., is less than or equal to) to the unloaded bypass threshold, the flow can proceed to 692-4. At 692-4, a bypass read operation is performed and a cache look-up operation can be performed to read data, if present, from a cache, as detailed herein. In some embodiments, the bypass read operation can be performed substantially contemporaneously with the cache look-up operation, as detailed herein. For instance, the bypass read operation can be initiated and/or performed in parallel with the cache look-up operation.

At 692-5, a determination can be made whether the cache look-up operation (as performed at 692-4) results in a cache miss or a cache hit. The determination can be made by the central controller portion of a memory controller such as a cache controller included in the central controller portion, among other possibilities.

Responsive to a determination that the cache look-up operation results in a cache hit, the flow can proceed to 692-6. At 692-6, data from the bypass memory operation can be discarded. Thus, data from the bypass memory operation is not cached-in or stored in the cache responsive to a determination that the cache look-up operation results in a cache hit. Such discarding of the data from the bypass memory operation ensures that redundant data (e.g., duplicative of the data read from the cache) is not cached-in or stored in the cache and/or avoids incurring any unnecessary impact on performance that would otherwise be attributable to storage of the bypass data in the cache.

Responsive to a determination that the cache look-up operation results in a cache miss, the flow can proceed to

692-7. At 692-7, a determination can be made whether the cache is clean. That is, the cache can be configured to operate in accordance with a cache management policy (i.e., caching policy) such as a write-through policy or a write-back policy. A "write-back policy" generally refers to a caching policy in which data is written to the cache without the data being concurrently written to a corresponding memory device such as a NAND memory device. Accordingly, data written to the cache (e.g., a volatile memory device) operating in accordance with a write-back policy may not have a corresponding data entry in the corresponding memory device such as the NAND memory device. Therefore, the data is identified as dirty data and/or a the cache line including such data is identified as a dirty cache line. Thus, as used herein, the term "dirty cache line" generally refers to cache lines that contain data that has been updated since the data stored in the cache has been written to the memory device.

Conversely, a "clean cache line" generally refers to cache lines that are without data that has been updated since the data stored in the cache has been written to the memory device. In various embodiments, a determination whether the cache is clean can determine whether some or all cache lines in the cache are clean cache lines. For instance, a determination can be made whether all cache lines in the cache are clean cache lines.

Responsive to a determination that the cache is clean, the flow can proceed to 692-8. At 692-8, the bypass data (resulting from performing the bypass read operation associated with the memory device) can be cached-in or stored in the cache and/or can be provided to the host. For instance, in some embodiments the bypass data can be cached-in to the cache and can be promulgated to the host. Thus, in instances with high cache miss rate (e.g., when a quantity of pending cache look-up operations satisfies (e.g., is less than or equal to) the bypass threshold) the host can timely receive requested data directly from the memory device rather than incur the computational overhead and delay associated with initially attempting to read the data from the cache, determining the data is not present in the cache (e.g., encountering a cache-miss), and subsequently obtaining the data from the memory device responsive to encountering the cache-miss.

Responsive to a determination that the cache is dirty (e.g., when one or more cache lines is dirty), the flow can proceed to 692-9. At 692-9, the bypass data (resulting from performing the bypass read operation associated with the memory device) can be cached-in or stored in the cache and/or can be promulgated to the host.

FIG. 7 illustrates another example of a diagram 794 for unloaded cache bypass in accordance with a number of embodiments of the present disclosure. As illustrated in FIG. 7, a quantity of pending cache look-up operations in a queue (e.g., pending cache look-up queue 365) of a cache can vary over time as represent by axis 797 (represents various times). That is, axis 797 represents various times associated with varying quantities of pending cache look-up operations.

For instance, at a first time 795-1 a cache look-up operation (e.g., a cache read command) can be received and a quantity of pending cache look-up operations in a pending cache read queue can be equal to "1", as illustrated in FIG. 7. At a second time 795-2 a cache look-up operation (e.g., a cache write command) can be received and a quantity of pending cache look-up operations in a pending cache read queue is still equal to "1". The read queue counter is not incremented upon receipt of the cache write command.

At a third time 795-3 a cache look-up operation (e.g., a cache read command) can be received and a quantity of pending cache look-up operations in a pending cache read queue can remain at "1". That is, the previous cache look-up operation (e.g., at the first time 795-1) has be completed prior to receipt of the cache look-up operation at the third time 795-3.

At a fourth time 795-4 a cache look-up operation (e.g., a cache read command) can be received and a quantity of pending cache look-up operations in a pending cache read queue can increment to "2". At the first time 795-1, the second time 795-2, the third time 795-3, and the fourth time 795-4 a quantity of pending look-up operations is less than or equal to an unloaded bypass threshold (e.g., an unloaded bypass threshold equal to three pending look-up operations). Thus, at the first time 795-1, the second time 795-2, the third time 795-3, and the fourth time 795-4 the cache is designated as being unloaded and cache bypassing is enabled and/or performed. That is, a respective quantity of pending look-up operations at the first time 795-1, the second time 795-2, the third time 795-3, and the fourth time 795-4 each satisfies (e.g., is less than or equal to) an unloaded bypass threshold.

However, at a fifth time 795-N a cache look-up operation (e.g., a cache read command) can be received and a quantity of pending cache look-up operations in a pending cache read queue can increment to a value "e.g., 3" that is equal to a bypass threshold "THR". At a sixth time 795-N+1 a cache look-up operation (e.g., a cache read command) can be received and a quantity of pending cache look-up operations in a pending cache read queue can increment to a value "e.g., 4" that is greater than a bypass threshold "THR". At a seventh time 795-N+2 a cache look-up operation (e.g., a cache read command) can be received and a quantity of pending cache look-up operations in a pending cache read queue can increment to a value "e.g., 5" that is greater than a bypass threshold "THR". Thus, unloaded cache bypassing is disabled and/or is not performed at the fifth time 795-N, the sixth time 795-N+1, the seventh time 795-N+2.

In addition, in some embodiments cache bypassing can remain disabled and/or is not performed until a quantity of pending cache look-up operations is less than an exit threshold (e.g., an exit threshold equal to 2 pending cache look-up operations). Thus, unloaded cache bypassing remains disabled and/or is not performed at an eighth time 795-N+3 at which time a cache look-up operation (e.g., a cache read command) can be received and a quantity of pending cache look-up operations in a pending cache read queue can increment to a value "e.g., 2" that is less than or equal to the bypass threshold but is greater than or equal to an exit threshold.

At a ninth time 795-N+4 a cache look-up operation (e.g., a cache write command) can be received and a quantity of pending cache look-up operations in a pending cache read queue can increment to a value "e.g., 1" that is less than a bypass threshold and is less than the exit threshold. Similarly, at a tenth time 795-N+5 a cache look-up operation (e.g., a cache read command) can be received and a quantity of pending cache look-up operations in a pending cache read queue can increment to a value "e.g., 1" that is less than or equal to a bypass threshold. Thus, at the ninth time 795-N+4 and the tenth time 795-N+5 unloaded cache bypassing is enabled and/or performed. For instance, at the ninth time 795-N+4 cache bypassing is enabled and is performed. While some approaches herein describe enabling/disabling cache bypassing (e.g., selectively permitting cache bypassing), in some embodiments cache bypassing can remain enabled but is only performed when a quantity of pending look-up operations satisfies an unloaded bypass threshold.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 216-1 to 216-N may be referred to generally as 216. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device; and
a memory controller coupled to the memory device and configured to receive a host read request, the memory controller comprising:
a cache;
a switch coupled to the memory device; and
a cache sequence controller coupled to the cache and the switch, configured to:
responsive to receiving the host read request, determine that a quantity of pending cache look-up operations in a queue of the cache satisfies a variable unloaded bypass threshold, wherein the variable unloaded bypass threshold is varied based on a cache hit rate of cache look-up operations associated with the cache; and
cause performance of a bypass read operation that bypasses the cache and accesses the memory device via the switch responsive to determining the quantity satisfies the variable unloaded bypass threshold.

2. The apparatus of claim 1, wherein the memory controller is configured to cause performance of a cache look-up operation associated with the cache substantially contemporaneously with the performance of the bypass read operation.

3. The apparatus of claim 2, wherein performance of the cache look-up operation results in a cache hit, and wherein the memory controller is further to discard data read from the memory device in association with the bypass read operation.

4. The apparatus of claim 2, wherein performance of the cache look-up operation results in a cache miss.

5. The apparatus of claim 4, wherein the cache miss is a clean cache miss, and wherein the cache sequence controller is further to cache-in data read from the memory device in association with the bypass read operation.

6. The apparatus of claim 4, wherein the cache miss is a dirty cache miss, and wherein:
the cache sequence controller is further to cache-in data read from the memory device in association with the bypass read operation; and
the memory controller is to cause performance of a cache write-back operation to write data from the cache to the memory device.

7. The apparatus of claim 1, wherein memory controller includes metric logic including counters, and wherein the counters comprise a cache hit counter, write hit counter, or a combination thereof.

8. The apparatus of claim 1, wherein the cache further comprises a cache memory and a cache controller.

9. The apparatus of claim 1, wherein the quantity of pending cache look-up operations satisfies the variable unloaded bypass threshold when the quantity of pending cache look-up operations is less than or equal to the variable unloaded bypass threshold.

10. A system, comprising:
a memory device; and
a memory controller coupled to the memory device and configured to receive a host read request, the memory controller comprising:
a cache;
a switch coupled to the memory device; and
a cache sequence controller coupled to the cache and the switch, configured to:
responsive to receiving the host read request:
determine, based on collected metrics, that a quantity of pending cache look-up operations in a queue of the cache satisfies a variable unloaded bypass threshold, wherein the variable unloaded bypass threshold is varied based on a cache hit rate of cache look-up operations associated with the cache;
cause performance of a cache look-up operation; and
in parallel with performance of the cache look-up operation, cause initiation of a bypass read operation that bypasses the cache and accesses the memory device via the switch to read data corresponding to the host read request from the memory device.

11. The system of claim 10, wherein the cache is configured to operate in accordance with a First-in First-out (FIFO) cache replacement policy.

12. The system of claim 10, wherein the cache sequence controller is to cause performance of a plurality of bypass read operations when the quantity of the pending cache look-up operations in the queue is less than or equal to the variable unloaded bypass threshold.

13. The system of claim 10, further comprising an exit threshold that is less than the variable unloaded bypass threshold, and wherein the cache sequence controller is to abstain from performance of a bypass read operation until the quantity of the pending look-up operations is less than the exit threshold.

14. The system of claim 10, wherein:
the variable unloaded bypass threshold is decreased based on the cache hit rate being above a target hit rate; and
the variable unloaded bypass threshold is increased based on the cache hit rate being below a target hit rate.

15. A method, comprising:
determining, by a memory controller coupled to a memory device, a quantity of pending cache look-up operations in a queue associated with a cache responsive to receiving a host access request;
determining the quantity of pending cache look-up operations is less than or equal to an unloaded bypass threshold that is variable based on a cache hit rate of cache look-up operations associated with the cache; and
responsive to determining the quantity of pending cache look-up operations is less than or equal to the unloaded bypass threshold:
causing performance of a bypass read operation that bypasses the cache and accesses the memory device via a switch of the memory controller that is coupled to the memory device; and
causing performance of a cache look-up operation associated with the cache substantially contemporaneously with the performance of the bypass read operation.

16. The method of claim 15, wherein data associated with the performance of the bypass read operation is selectively utilized based on a type of result of the cache look-up operation.

17. The method of claim 15, wherein the unloaded bypass threshold is equal to a non-zero quantity of pending cache look-up operations.

18. The method of claim 15, wherein the unloaded bypass threshold is equal to zero pending cache look-up operations.

* * * * *